United States Patent
Chakraborty et al.

(10) Patent No.: US 11,043,103 B1
(45) Date of Patent: Jun. 22, 2021

(54) CONNECTED ROOF DRAIN

(71) Applicant: Zurn Industries, LLC, Milwaukee, WI (US)

(72) Inventors: Arindam Chakraborty, Milwaukee, WI (US); Kevin Brockman, Milwaukee, WI (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 17/010,522

(22) Filed: Sep. 2, 2020

(51) Int. Cl.
*G08B 21/00* (2006.01)
*G08B 21/20* (2006.01)
*G08B 21/18* (2006.01)
*H04Q 9/02* (2006.01)

(52) U.S. Cl.
CPC ........... *G08B 21/20* (2013.01); *G08B 21/182* (2013.01); *H04Q 9/02* (2013.01); *H04Q 2213/053* (2013.01)

(58) Field of Classification Search
CPC ........ G08B 21/20; G08B 21/182; H04Q 9/02; H04Q 2213/053
USPC ..................................................... 340/870.7
See application file for complete search history.

(56) References Cited

U.S. PATENT DOCUMENTS

| | | | |
|---|---|---|---|
| 4,248,258 A * | 2/1981 | Devitt | H01L 31/02021 137/124 |
| 5,524,393 A | 6/1996 | Nill et al. | |
| 5,531,543 A | 7/1996 | Johnsen | |
| 5,727,350 A | 3/1998 | Marcella | |
| 6,821,053 B2 | 11/2004 | Martinez | |
| 6,881,953 B2 | 4/2005 | Weiland et al. | |
| 6,926,210 B2 | 8/2005 | Baxter | |
| 7,174,676 B1 | 2/2007 | Armstrong | |
| 7,568,640 B2 | 8/2009 | Rademacher | |
| 7,802,338 B1 | 9/2010 | Hall | |
| 7,869,944 B2 | 1/2011 | Deaton et al. | |
| 8,059,004 B2 | 11/2011 | James et al. | |
| 8,215,080 B2 | 7/2012 | McNeish et al. | |
| 8,584,403 B2 | 11/2013 | Frelier | |
| 9,121,779 B2 | 9/2015 | Martin | |
| 9,127,445 B2 | 9/2015 | Dunn | |
| 9,482,008 B2 | 11/2016 | Iannelli | |
| 9,631,356 B2 | 4/2017 | Nesbitt et al. | |
| 9,695,593 B2 | 7/2017 | Vokey et al. | |
| 9,725,908 B2 | 8/2017 | Ashton-Miller et al. | |
| 9,777,482 B1 | 10/2017 | Saleh et al. | |
| 9,829,396 B2 | 11/2017 | Ayon et al. | |
| 9,920,511 B2 | 3/2018 | Goldberg et al. | |
| 10,171,892 B2 | 1/2019 | Petracheck et al. | |
| 10,208,462 B2 | 2/2019 | Carter et al. | |
| 10,253,503 B2 | 4/2019 | Greenberg | |
| 10,287,775 B2 | 5/2019 | Wu et al. | |
| 10,302,817 B2 | 5/2019 | Stettler et al. | |
| 10,344,481 B2 | 7/2019 | Song | |

(Continued)

*Primary Examiner* — Ojiako K Nwugo
(74) *Attorney, Agent, or Firm* — Michael Best & Friedrich LLP (57) ABSTRACT

A connected roof drain assembly including a roof drain, a sensor group in operable communication with the roof drain and configured to output signals representative of the fluid flow therethough, and a communication assembly configured to receive the signals output by the sensor group and wirelessly transmit data to a user portal based at least in part on the signals output by the sensor group.

22 Claims, 7 Drawing Sheets

(56) References Cited

U.S. PATENT DOCUMENTS

| | | |
|---|---|---|
| 10,489,813 B1 | 11/2019 | De Guia et al. |
| 10,590,640 B2 | 3/2020 | Pearce, III et al. |
| 2006/0033629 A1 | 2/2006 | Froeter et al. |
| 2008/0229673 A1 | 9/2008 | LaMorte et al. |
| 2012/0062384 A1* | 3/2012 | McDanal ................. G08B 3/10 |
| | | 340/605 |
| 2013/0233806 A1 | 9/2013 | Dannrup et al. |
| 2014/0230857 A1 | 8/2014 | Dziubinschi et al. |
| 2014/0260687 A1 | 9/2014 | Beldon |
| 2015/0218785 A1 | 8/2015 | Shapiro et al. |
| 2015/0269830 A1 | 9/2015 | Beldon |
| 2016/0009568 A1 | 1/2016 | Howell |
| 2016/0084986 A1 | 3/2016 | Zach et al. |
| 2017/0087713 A1 | 3/2017 | Marshall |
| 2017/0130459 A1* | 5/2017 | Vokey ................... G01M 3/165 |
| 2017/0183243 A1 | 6/2017 | Reitmeyer et al. |
| 2018/0054662 A1* | 2/2018 | Petrachek ................ H04L 67/12 |
| 2018/0111852 A1 | 4/2018 | Rauch et al. |
| 2020/0019287 A1* | 1/2020 | Sahai .................... G06F 3/0484 |

* cited by examiner

CONNECTED ROOF DRAIN

FIELD

The disclosure relates to roof drains and more specifically to smart and connected roof drains.

BACKGROUND

Roof drain systems typically include a primary and an overflow system. Generally speaking the presence of water in the overflow system indicates that the primary system is clogged and/or is unable to handle the water load on the roof.

SUMMARY

In one embodiment, the disclosure provides a connected roof drain assembly including a roof drain, a sensor group in operable communication with the roof drain and configured to output signals representative of the fluid flow therethough, and a communication assembly configured to receive the signals output by the sensor group and wirelessly transmit data to a user portal based at least in part on the signals output by the sensor group.

In another embodiment, the disclosure provides a connected roof drain assembly including a roof drain, a sensor group in operable communication with the roof drain and configured to output signals based at least in part on the flow of fluid through the roof drain, where the sensor group includes one or more sensors; and a user portal configured to receive and analyze the signals output by the sensor group, where the user portal is also configured to receive and analyze weather information from a weather source, and where the user portal is configured to produce a set of alert conditions for the at least one of the one or more sensors of the sensor group based at least in part on the signals from the sensor group and the weather information.

In another embodiment, the disclosure provides a connected roof drain assembly for use with a cloud network. The connected roof drain assembly includes a roof drain, a sensor group in operable communication with the roof drain and configured to output signals representative of the fluid flow therethough, and a communication assembly configured to receive the signals output by the sensor group and maintain a sensor status state for each sensor to produce a sensor status matrix, where the communication assembly is configured to wirelessly transmit the sensor status matrix to the cloud network.

In another embodiment, the disclosure provides a connected roof drain assembly comprising a roof drain, a sensor group in operable communication with the roof drain and configured to output signals representative of the fluid flow therethough, and a connection interface configured to receive the signals output by the sensor group and maintain a sensor status state for each sensor to produce a sensor status matrix.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIGS. 1-4 illustrate a connected roof drain assembly 10 for installation on the roof 14 of a building 18. While the illustrated embodiment is shown on a horizontal or flat roof 14, it is understood that in alternative embodiments the roof drain assembly 10 may be installed on roofs having other orientations and grades.

The roof drain assembly 10 includes one or more roof drains 26 mounted to the roof 14, a primary drain system 30 associated with at least one roof drain 26, an overflow drain system 32 associated with at least one roof drain 26, a sensor group 34 associated with at least one roof drain 26, and a connection interface 38 in operable communication with at least one sensor group 34. During use, the connection interface 38 is in two-way operable communication with a portal 22 whereby any data transmitted by the connection interface 38 may be presented to the user and any user commands can be relayed back to the roof drain assembly 10.

Figure 4:
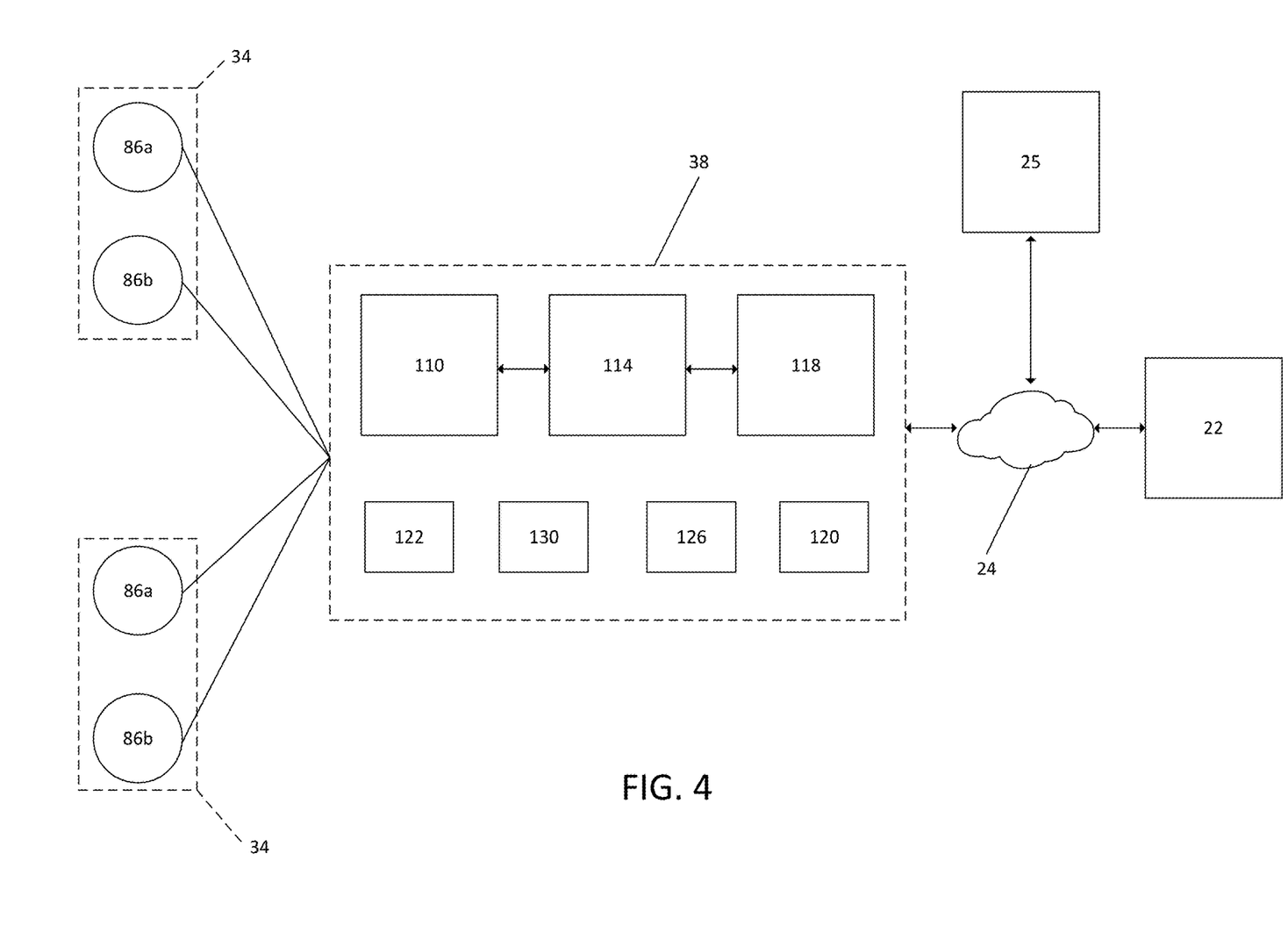
FIG. 4 is a schematic view of the connected roof drain assembly.

The connection interface 38 allows data collected from the roof drain assembly 10 to be transmitted to external devices over a communication network 24. The communication network 24 may include the Internet, LAN, a WAN, such as a LoRa system, and the like, or a combination thereof.

The portal 22 can be accessed by a user device 25 includes a computing device, such as a desktop computer, a laptop computer, a tablet computer, a terminal, a smart telephone, a smart television, a smart wearable, or another suitable computing device that interfaces with a user. A user may interact with and access data associated with one or more of the roof drain assemblies 10. The user device 25 may be used by an end user to monitor and manage operation of the one or more roof drain assemblies. For example, a user may access and interact with the data to view and understand usage patterns, which may allow a user to see maintenance insights into, for example, how to optimize operation of the roof drain assembly or assemblies 10.

Figure 1:
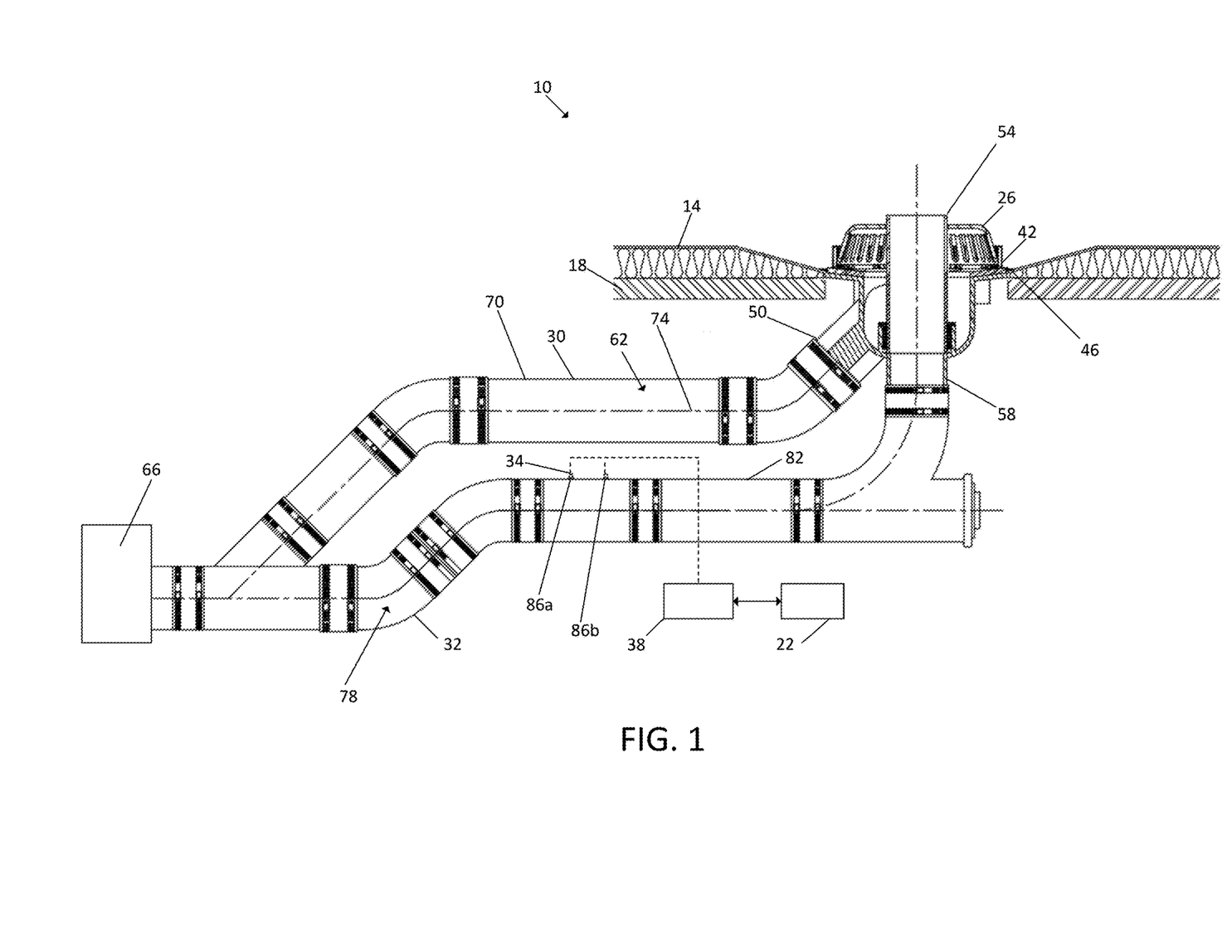
FIG. 1 illustrates a connected roof drain assembly installed on the roof of a building.

While the illustrated roof drain assembly 10 includes a single roof drain 26 feeding a single primary drain system 30 and a single overflow drain system 32, it is understood that in alternative embodiments a sensor group 34 may be mounted to systems being fed by multiple roof drains 26. In still other embodiments multiple independent primary and overflow systems 30, 32 may be present, each having a dedicated sensor group 34. In such embodiments, the connection interface 38 may simultaneously communicate with each of the sensor groups 34 independently. For the purposes of this application, only a single roof drain 26 will be illustrated.

The roof drain 26 of the roof drain assembly 10 includes a body 42 with a primary flow inlet 46, primary flow outlet 50, overflow inlet 54, and overflow outlet 58. When installed, the primary flow outlet 50 is configured to direct rainwater into the primary drain system 30 while the overflow outlet 58 is configured to direct rainwater into the overflow drain system 32. As shown in FIG. 1, the primary inlet 46 is positioned vertically lower than the overflow inlet 54. As such, rainwater will initially flow into the primary inlet 46 and out through the primary outlet 50 (e.g., into the primary drain system 30) until the water level on the roof 14 exceeds the vertical height of the overflow inlet 54 at which point the rainwater will then flow through both systems (e.g., through the primary outlet 50 into the primary drain system 30 and through the overflow outlet 58 and into the overflow drain system 32). While the illustrated embodiment shows a single roof drain 26 having both primary and overflow capabilities, it is understood that in alternative embodiments, two separate roof drains (not shown) may be present with a first drain having a primary inlet at a first vertical height above the roof 14 while the second drain has an overflow inlet and outlet as described above.

As shown in FIG. 1, the primary drain system 30 includes an elongated pipe or tube forming a channel 62 therethrough between the primary outlet 50 and a water depository 66 (e.g., the local water system, sewer, collection tank, and the like). The primary drain system 30 also includes at least one horizontal section 70 positioned downstream of the roof drain 26 and upstream of the depository 66. The horizontal section 70, in turn, is a length of pipe or tube whose central axis 74 is oriented substantially horizontally. In some embodiments, the axis 74 of the horizontal section 70 is within 1 degree of horizontal. In other embodiments, the axis 74 of the horizontal section 70 is within 2 degrees of horizontal. In still other embodiments, the axis 74 of the horizontal 70 is within 3 degrees of horizontal. In still other embodiments, the axis 74 of the horizontal 70 is within 5 degrees of horizontal.

The overflow drain system 32 includes an elongated pipe or tube forming a channel 78 therethrough between the overflow outlet 58 and the water depository 66. As shown in FIG. 1, the overflow drain system 32 also includes at least one horizontal section 82 positioned downstream of the roof drain 26 and upstream of the depository 66. In the illustrated embodiment, the horizontal section 82 of the overflow system 32 is positioned vertically below the horizontal section 70 of the primary system 30.

Figure 2:
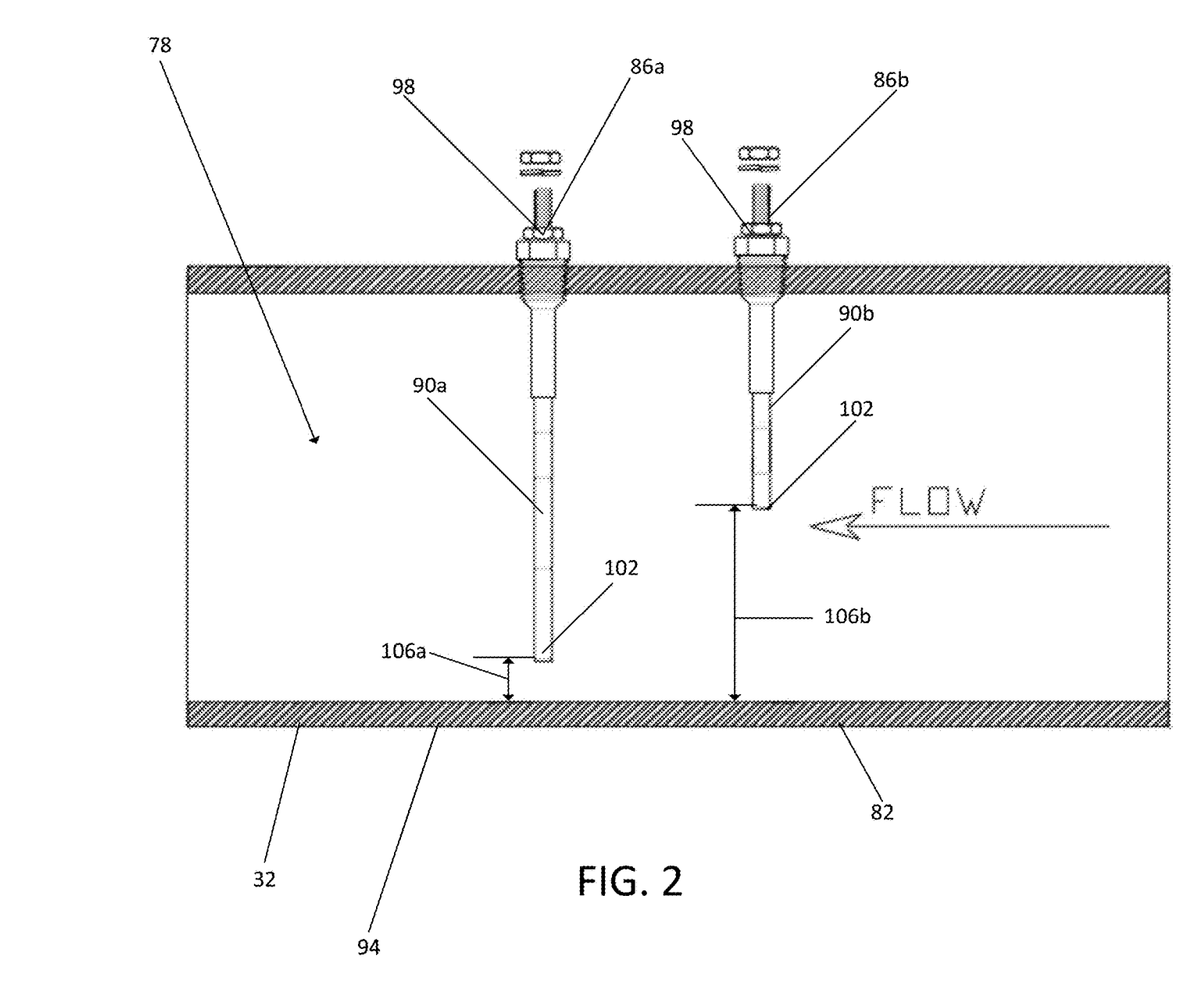
FIG. 2 illustrates a section view of a horizontal section of an overflow drain system with sensors installed therein.

The sensor group 34 of the roof drain assembly 10 includes a plurality of individual sensors 86a, 86b each in operable communication with the channel 78 of the overflow drain system 32. During use, the sensors 86a, 86b are configured to detect the fluid flow level within the channel 78 of the overflow drain system 32 and output one or more signals to the connection interface 38 corresponding to the detected flow level. More specifically, sensor group 34 is configured to output a signal when the fluid flow level within the channel 78 exceeds one or more pre-determined thresholds.

In the illustrated embodiment, the sensor group 34 includes a first sensor 86a and a second sensor 86b. Together, the sensors 86a, 86b are configured to output signals signifying a first, "low alarm" and a second, "high alarm." More specifically, the first sensor 86a outputs a signal indicating a low alarm when the flow level within the channel 78 exceeds a first pre-determined threshold value. The second sensor 82b outputs a signal indicating a high alarm when the flow level within the channel 78 exceeds a second pre-determined threshold that is greater than the first pre-determined threshold. While the illustrated embodiment includes a pair of sensors 86a, 86b having a high and low alarm, in alternative embodiments the sensor group 34 may include additional sensors (not shown) corresponding to additional flow levels. In still other embodiments, the sensor group 34 may include additional sensors configured to detect other attributes such as, but not limited to, water temperature, water acidity, channel blockages, and the like. In still other embodiments, the sensor group 34 may only include a single sensor.

Each sensor 86a, 86b of the sensor group 34 includes a probe 90a, 90b that may be mounted to the channel wall 94 and positioned within the horizontal section 82 thereof. Each probe 90a, 90b, in turn, includes a base 98 attached (e.g., sealingly threaded) to the channel wall 94 and a distal end 102 located within the channel 78 and configured to detect when it comes into contact with water. As shown in FIG. 2, each probe 90a, 90b is positioned within the channel 78 at a unique channel height 106a, 106b to correspond with the desired flow level the sensor 86a, 86b is intended to detect. Generally speaking, the smaller the channel height 106a, 106b, generally defined as the vertical distance between the probe's distal end and the lowest vertical point of the channel wall 94, the lower the threshold level required to trigger the sensor. As such, the first sensor 86a, (corresponding with the low alarm) is set at a first channel height 106a that is less than the second channel height 106b of the second sensor 86b (corresponding with the high alarm). While the illustrated sensors 86a, 86b have a single sensing point for a given probe 90a, 90b, it is understood that in alternative embodiments a single probe may have multiple sensing points to allow it to detect multiple flow levels.

Figure 3:
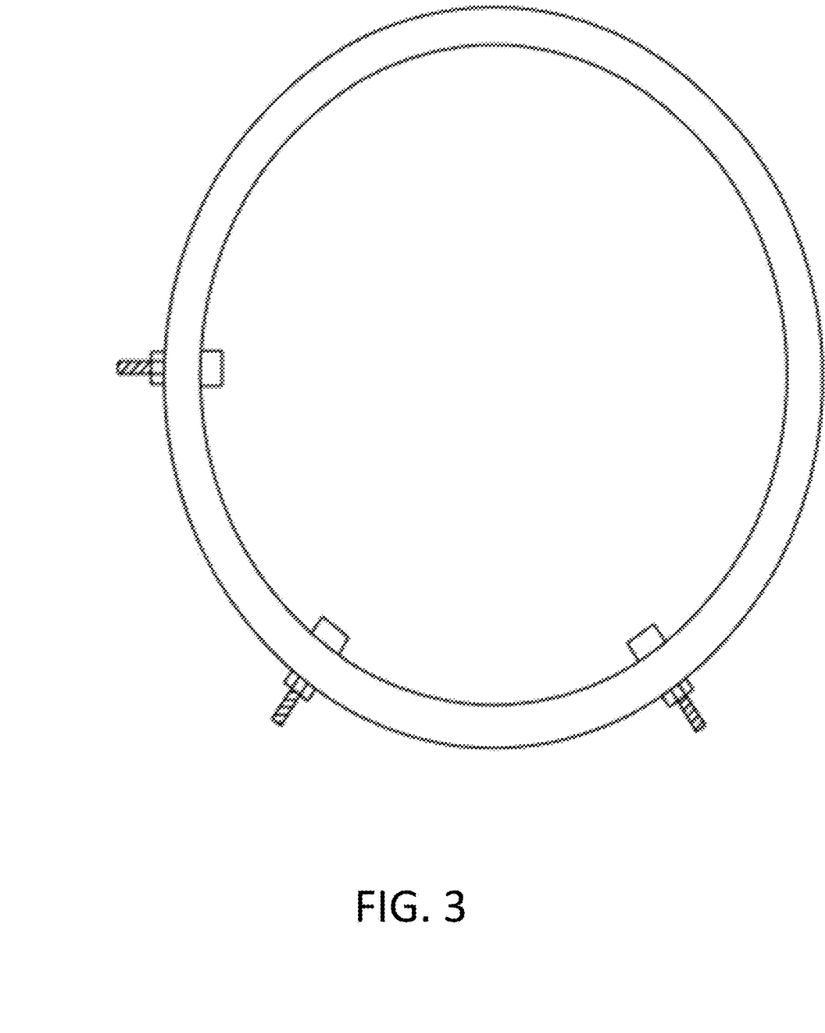
FIG. 3 illustrates an alternative section view of an overflow drain system with sensors installed therein.

While the illustrated sensors 86a, 86b include probes 90a, 90b extending into the channel 78, in alternative embodiments the sensors 86a, 86b may include contacts mounted to the channel wall 94 at different locations corresponding to different channel heights 106 (see FIG. 3). In still other embodiments, still other sensor types and styles may be used to detect and output signals representing the presence of water within the channel or the flow level within the channel.

Illustrated in FIG. 4, the connection interface 38 of the roof drain assembly 10 is in operable communication with the sensor group(s) 34 and configured to output signals to the portal 22 notifying the user when water flow is present in the channel 78 and the magnitude of such flow. More specifically, the connection interface 38 is configured to receive the signals (e.g., electrical outputs) output by the sensors 86a, 86b, interpret the signals from the sensors 86a, 86b, and transmit data regarding the signals to the portal 22. The connection interface 38 is also configured to receive user inputs and data from the portal 22, interpret those commands, and send signals back to the sensors 86a, 86b (e.g., such as to clear alarms and the like).

In the illustrated embodiment the connection interface 38 includes a flow sensor electronic processor 110 configured to receive the signals from the sensor group(s) 34 directly, an end point 114 to interpret the signals from the processor 110, a gateway 118 to wirelessly transmit the interpreted data to the portal 22, and memory 120 to save and store data and operating parameters. The flow sensor processor 110 includes a microprocessor, an application-specific integrated circuit ("ASIC"), or another suitable electronic device for processing data, and the memory 120 includes a non-transitory, computer-readable storage medium. The electronic processor 110 is configured to access and execute computer-readable instructions ("software") stored in the memory 120. The software may include firmware, one or more applications, program data, filters, rules, one or more program modules, and other executable instructions. For example, the software may include instructions and associated data for performing a set of functions, including the methods described herein. For example, in some embodiments, the electronic processor 110 is configured to manage and/or monitor the operation of the roof drain either directly or indirectly. The electronic processor 110 is also configured to transmit and receive data, such as data associated with the operation of the roof drain to the endpoint 114.

The flow sensor processor 110 of the connection interface 38 is in operable communication with each of the individual sensors 86a, 86b of the sensor group 34 and independently maintains a "sensor status state" for each (e.g., either "activated" or "not activated") which is collectively referred to as the "sensor state matrix." More specifically, the processor 110 collects the raw data from the sensors 86a, 86b, generally in the form of electrical signals, and converts those signals to a particular sensor status state readable by the endpoint 114 (e.g., I2C). In the illustrated embodiment, the flow sensor processor 110 begins with a baseline status of "not activated" for each sensor 86a, 86b. Once a sensor 86a, 86b is triggered (e.g., by having the distal end 102 come into contact with water) the processor 110 is then configured to change that particular sensor's status from "not activated" to "activated" and maintain the sensor in the "activated"=status until cleared by the endpoint 114. For example, if water level within the channel 78 exceeds the first channel height 106a, the distal end 102 becomes submerged in the water flow causing the first sensor 86a to become triggered. The flow sensor processor 110 then changes the state of the first sensor 86a from "not activated" to "activated." As indicated above, the processor 110 will then maintain the first sensor 86a in the "activated" state until it is instructed to clear the alarm by the endpoint 114.

While the illustrated processor 110 is shown in communication with a single sensor group 34, it is to be understood that in alternative embodiments a single processor 110 may communicate with multiple sensor groups simultaneously and independently. In such embodiments, the processor 11—is configured to organize and monitor the state of each senor from each group 34 individually. As such, if a sensor is triggered, the processor 110 will be able to communicate via the sensor status states exactly which sensor has been triggered and from which group.

The endpoint 114 of the connection interface 38 is in operable communication with the flow sensor processor 110 and the gateway 118. The endpoint 114 is configured to collect and transmit (via the gateway 118) the sensor status matrix (e.g., the sensor status state for each individual sensor in operable communication with the associated processor 110) to the portal 22 for subsequent analysis. More specifically, the endpoint 114 is configured to transmit the sensor status matrix to the portal 22 at predetermined intervals regardless of whether a status change of any individual state has occurred (e.g., once every hour). Furthermore, the endpoint 114 is configured to transmit the sensor status matrix every time the status of any individual sensor has changed (e.g., from "not activated" to "activated"). When a transmission is to occur, either pre-scheduled or due to a status change, the endpoint 114 first communicates with the processor 110 so that a complete download of current sensor status matrix is completed beforehand. By doing so, the endpoint 114 is able to verify that the information transmitted is accurate and that no status updates occurred that were not logged by the endpoint 114 due to transmission errors and the like.

The endpoint 114 is also configured to transmit instructions from the user (e.g., entered via the portal 22) back to the processor 110 and the sensor group(s) 34 themselves. In such instances, a command or other input from the user may be entered into the portal 22 (described below), whereby the information will be transmitted wirelessly via the gateway 118 to the endpoint 114. The endpoint 114 will then interpret those commands and forward the necessary signals back to the processor 110. Such signals may include, but are not limited to alarm resets, calibration changes and updates, data requests, and the like.

The gateway 118 is a wireless communication device configured to receive information and instructions from the endpoint 114 and convey the resulting information, wirelessly, via packet forwarding, to the communication network 24. The gateway 118 is also configured to receive wireless communications from the communication network 24 and convey that information back to the endpoint 114.

While the illustrated connection interface 38 is described as four modules (processor 110, endpoint 114, gateway 118, and memory 120), it is to be understood that in alternative embodiments the tasks and capabilities of each module may be combined together or sub-divided in any sub-combination of modules. For example, in some embodiments, the processor 110, endpoint 114, gateway 118, and memory 120 may all be combined into a single module or unit. In still other embodiments, one of the gateway 118, endpoint 114, processor 110, or memory 120 may be a separate module or unit. Furthermore, each of the four modules may be physically located together or separately (e.g., in different locations, in different housings, and the like) in various combinations. While the illustrated interface 38 communicates wirelessly with the cloud network via the gateway 118, it is also understood that wired communications between the connection interface 38 and the communication network 24 may occur either to supplement wireless communication or in replacement thereof.

As shown in FIG. 4, the connection interface 38 may also include a power source (e.g., battery) 122. A battery can be used either as a backup to permit the interface 38 to operate when the local electrical grid is down or as a stand-alone battery powered device in instances where electrical power may not be present. In such embodiments, the connection interface 38 may be re-programmable (either manually or via the porta; 22) to adjust the frequency at which the endpoint 114 transmits the sensor status state to the portal 22 to help preserve electrical power.

The connection interface 38 may also include manual sensor state displays 126 and a manual reset 130. More specifically, in addition to sending and receiving information regarding the sensor status information via the portal 22, the connection interface 38 may also have onboard or local physical indicia or displays to send and receive information. Such capabilities may include, but are not limited to, indicator lights 134 or other indicia signaling the sensor status information. The interface 38 may also include physical buttons 138 or other user interfaces allowing the user to command the system to clear one or more of the alarms.

Figure 5:
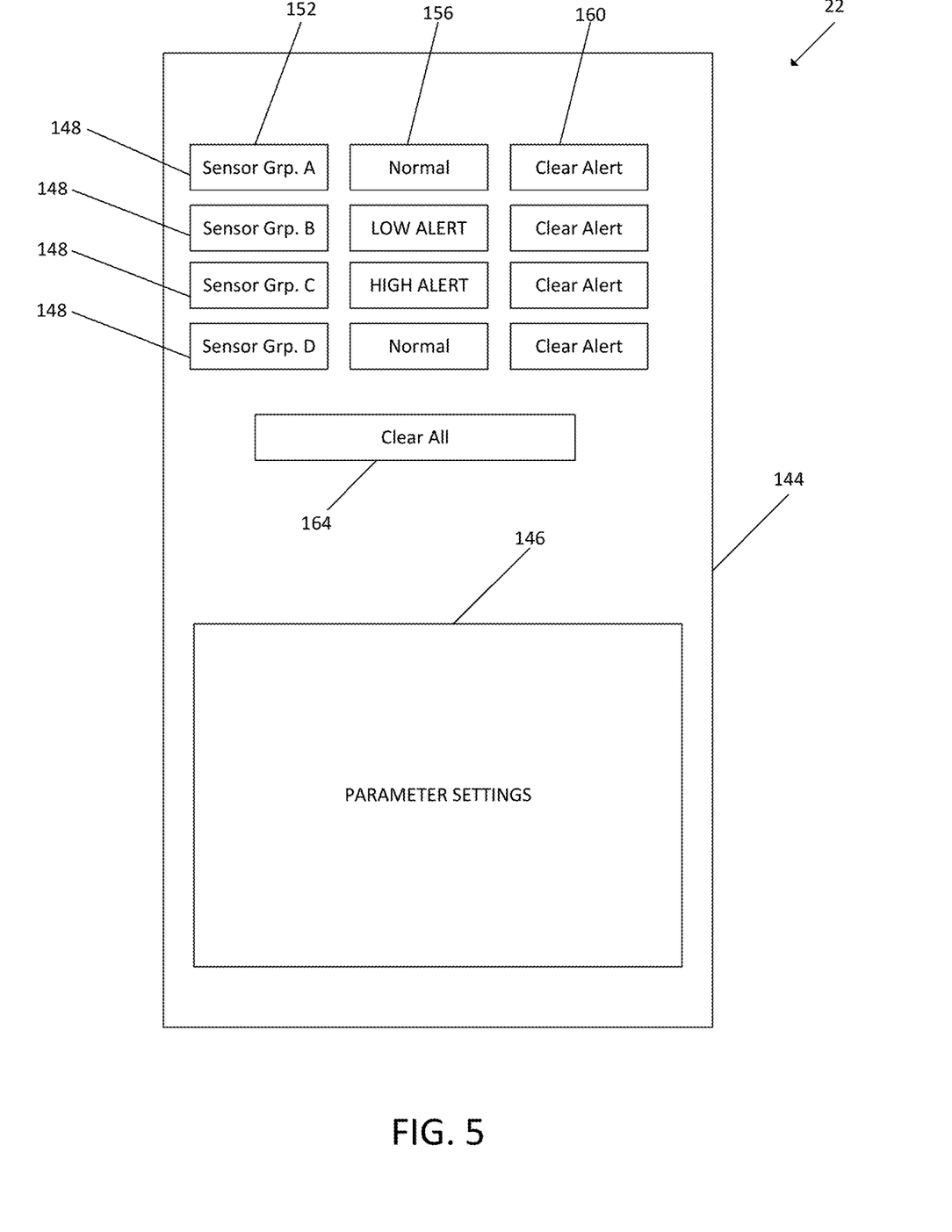
FIGS. 5-7 illustrate various displays of a user portal.
Figure 6:
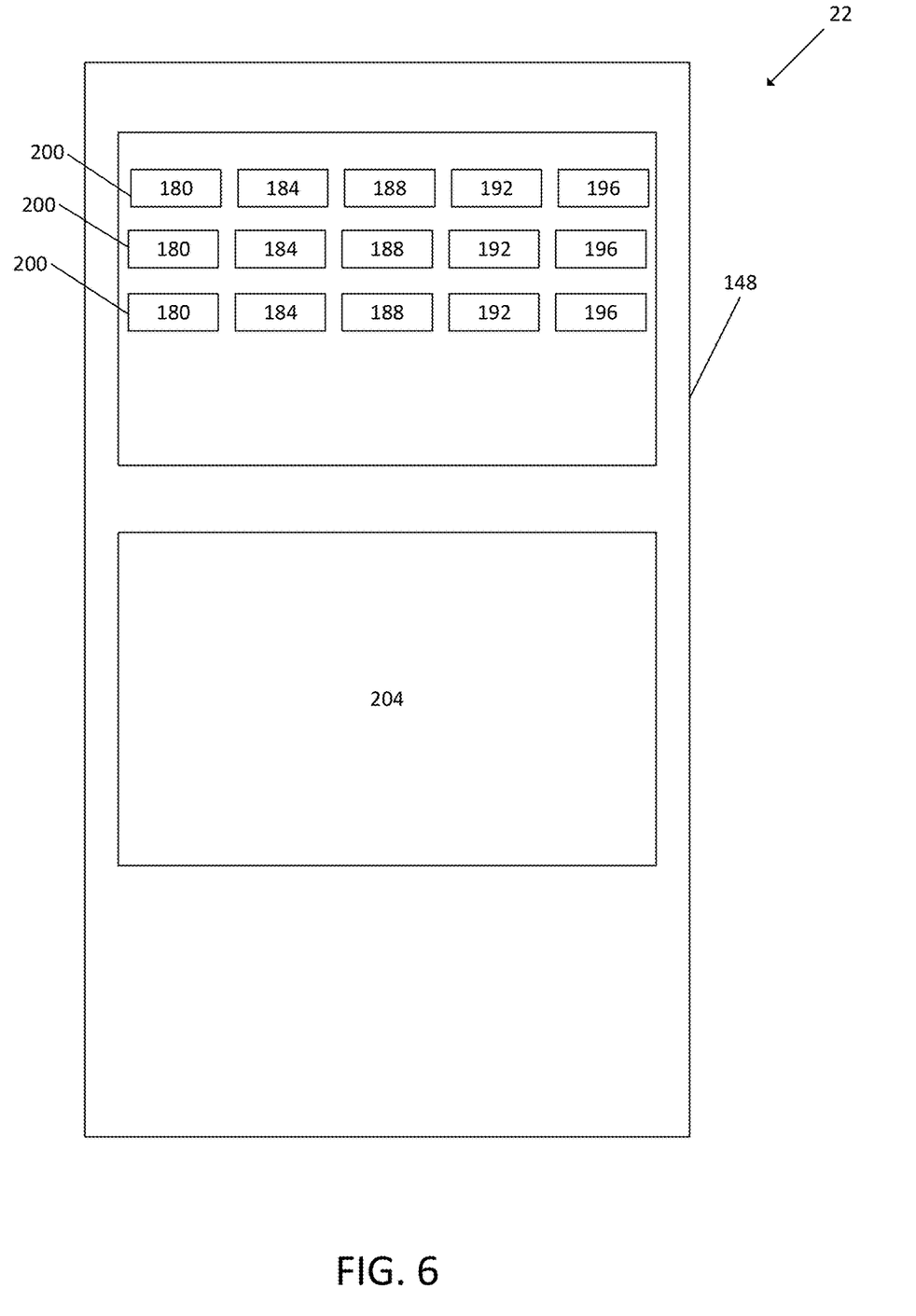
Figure 7:
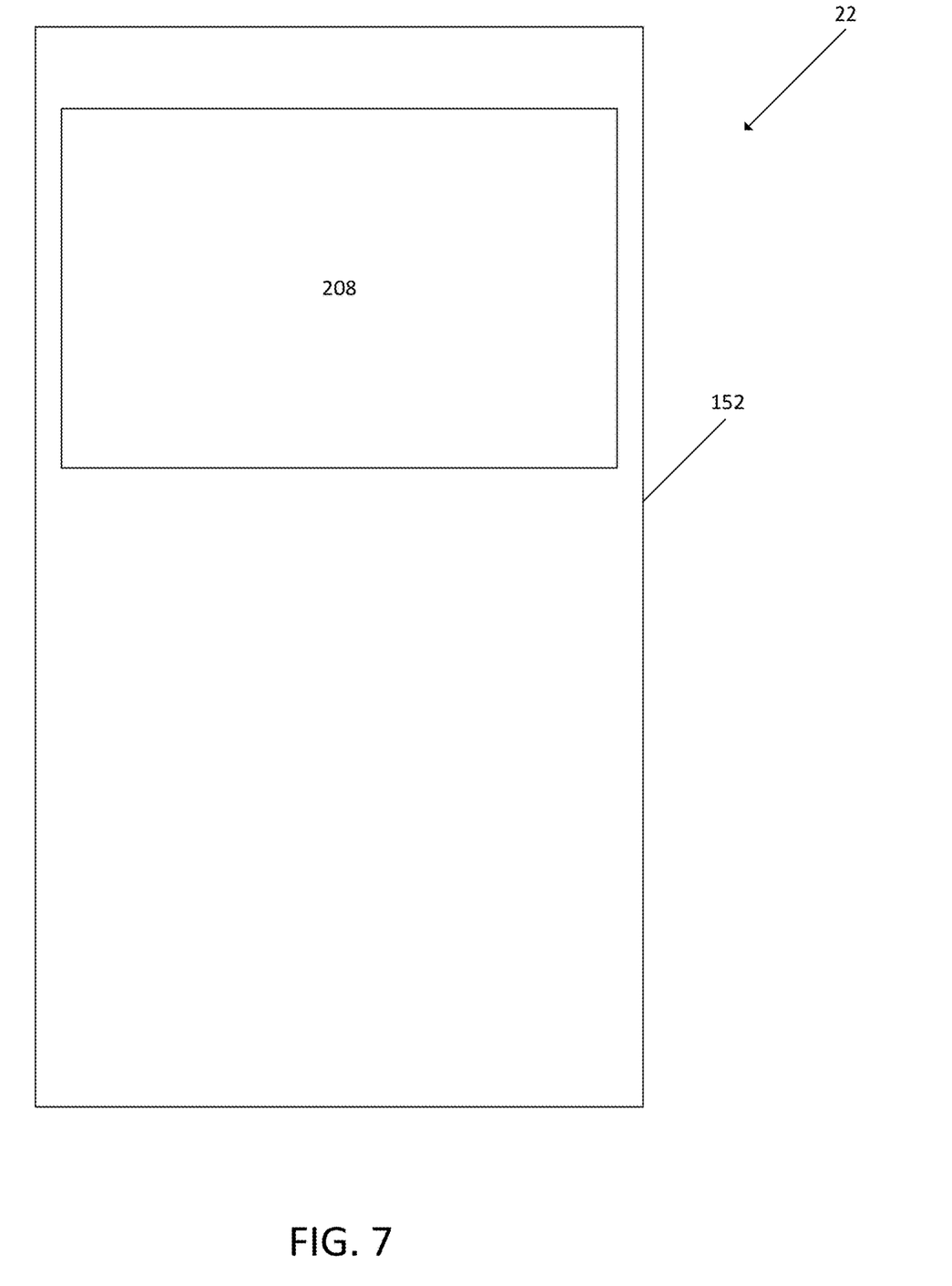

FIGS. 5-7 illustrate the portal 22 in configured to interpret, analyze and display information output by the connected roof drain assembly 10. The portal 22 includes a graphical display accessible and interactable by the user on one or more screens such as, but not limited to, cell phones, computers, tablets, and the like. The portal 22 may include software saved in the memory of one or more devices or be web-accessible via an internet connection and the cloud. The portal 22 may also include a plurality of interactable displays, charts, maps, graphs, and the like to convey the collected and processed information to the user. The portal 22 may also include one or more user selectable virtual inputs through which the user can enter information or parameters into the portal 22 or command the portal 22 to accomplish various tasks. As shown in FIGS. 5-7, the illustrated portal 22 includes a current status interface 144, an alarm logging interface 148, and a weather interface 152.

The current status interface 144 is configured to graphically and textually display the current status of each sensor group 34 and/or roof drain 26 to the user. (FIG. 5). Generally speaking, the portal 22 is configured to associate the status of any sensor group 34 to all roof drains 26 feeding it (e.g., all roof drains 26 that flow into that particular sensor group 34). As such, if two roof drains (Roof Drain A, Roof Drain B) flow into a single sensor group 34 (Sensor Group A). If a low alert is triggered in Sensor Group A, the portal 22 will show that Sensor Group A has a low alert, Roof Drain A has a low alert, and Roof Drain B has a low alert.

As shown in FIG. 5, the interface 144 includes a plurality of entries 148, each corresponding to a particular drain entity (e.g., a sensor group 34 and/or roof drain 26). Each entry 148, in turn, includes 1) identifying information 152 to identify the specific drain entity to which it pertains (e.g., the name of the group, location of the group within the building, and the like), 2) status indicia 156 configured to graphically and/or textually display the current status of the identified group 34, and 3) a reset button 160.

As shown in FIG. 5, the identifying information 152 may include, but is not limited to, listing the name of the particular drain entity to which it pertains (e.g., "North Roof Drain," Sensor Group A", and the like). In other embodiments, the identifying information 152 may also include location data (e.g., coordinates, associated building name, etc.), a photograph of the corresponding entity, a map indicating where the entity is located, and the like. In still other embodiments, the identifying information 152 may also include a GPS link.

The status indicia 156 of the interface 144 is configured to convey the current status of the drain entity to which it pertains. Such status indicia 156 may include, but is not limited to: "Normal," "Low Alarm," "High Alarm," "System Error," "Connection Lost," "Battery Low" and the like. The indicia 156 may also be color-coded as needed to help with immediate and easy identification of the status (e.g., green for normal, yellow for low alarm, and red for high alarm). The interface 144 may also include a time-stamp associated with each status indicia 156 to communicate to the user when the status change occurred. In instances where a large number of sensor groups 34 are present, the interface 144 may also include sorting capabilities to display a subset of all available drain entities. Such sorting may occur by building, roof region, sensor type, roof type, and the like. In still other embodiments, the user may be able to switch between a "sensor group" view and a "roof drain" view.

The reset button 160 of the interface 144 is configured to allow the user to instruct the connection interface 38 to "reset" the status of each sensor associated the listed drain entity (e.g., change from "activated" to "not activated"). More specifically, selecting the button 160 causes the portal 22 to convey instructions back to the connection interface 38 whereby the processor 110 will change the status of each sensor contained in the group 34 to "not activated." As shown in FIG. 5, the interface 144 may also include a "master reset" button 164 allowing the user to reset the status of all sensor groups 34 falling in a predetermined subset or globally.

In some embodiments, the current status interface 144 may also include user interface buttons and inputs to allow the user to communication with the drain entities and change one or more operating parameters. For example, the interface 144 may include the ability to change certain operating parameters such as, but not limited to, the duration a sensor must be triggered before triggering a particular alert, how often the endpoint 114 transmits data to the portal 22, what forms of communication will be used to communicate an alert to the user (e.g., text message, audible alarm, push notification, email, and the like), what types of alarms are associated with each type of notification (e.g., only high alerts get audible alarms, all alarms should be reported via text message, and the like), and the ability to turn on and off certain sensor groups 34.

As shown in FIG. 6, the alarm logging interface 148 is configured to display graphically and textually the details and history of any alarms generated by the connected roof drain assembly 10. More specifically, the logging interface 148 displays 1) identifying information for the alarm 180 (e.g., the name of the associated sensor group 34 and the like), 2) the time the alarm started 184, 3) the time the alarm ended 188, 4) the duration of the alarm 192, and 6) the type of alarm 196 (e.g. a low alert, a high alert, and the like). In the illustrated embodiment, the interface 148 includes a series of entries 200, whereby each entry 200 includes the above listed data. In some embodiments, the logging interface 148 may also include organizational and filtering tools to allow the entries 200 being display to be sorted and re-ordered. In such embodiments, the entries 200 may be organized by building, location, status, drain type, roof type, and the like.

The logging interface 148 also includes a graphical interface 204 configured to display historical trends and other alert data in a graphical or chart format. Such data may include mapping the alerts on a calendar to show date trends, overlaying the data with weather data (see below), displaying the alerts on a blueprint or other map of the roof(s) in question, displaying the number of times each roof drain 26 has had alerts occur in order of instances, and the like.

As shown in FIG. 7, the weather interface 152 is configured to associate and correlate weather data with the alert data generated by the connected roof drain assembly 10 to predict when and where future alerts may occur. To do so, the weather interface 152 references not only the historical alert data logged by the portal 22 from the connected drain assembly 10, but also catalogs and analyzes historical and real-time weather data from various sources. In some embodiments, the weather interface 152 may reference historical and real-time weather data generated by "local weather sensors" (e.g., rain gauges, wind gauges, and the like) located on or near the buildings and roofs 14 themselves. In other embodiments, the weather interface 152 may reference the national weather service or other weather service information generated for the immediate vicinity of the relevant buildings. In still other embodiments, the weather interface 152 may take both local and national weather service data into account.

The weather interface 152 includes a historical display 208 overlaying and correlating past weather information (e.g., when and how much rainfall occurred over a particular time period in the past) with any alert information associated with that same time period. Such a graphical display may include, but is not limited to a calendar or list with each entry (e.g., hour, day, week, month) listing or graphically displaying the amount of rainfall that occurred on that particular hour/day/week/month (e.g., in inches) along with any alerts that were triggered over that same time period. In instances where the portal 22 is monitoring multiple buildings in different locations, the display 208 may also be sorted to display the relevant data for each building individually. The display 208 may also include future dates with anticipated rainfall or other weather forecast data (e.g., a five day forecast) included thereon.

The weather interface 152 also analyzes historical weather and alert data and uses the data to predict when and where future alerts may be generated. More specifically, the system correlates the volume of rainfall (e.g., inches/hr) falling on a particular roof and any alerts that are generated due to the resulting rainfall. The interface 152 then analyzes the data to generate a unique set of "alert conditions" for each the sensor groups 34 associated therewith. Such alert conditions may include, but are not limited to, a threshold overall volume of rainfall (e.g., inches of rain), a threshold rate of rainfall (e.g., inches/hr), and the like. The interface 152 then analysis future forecast data to determine if and when such alert conditions may occur in the future and triggers alerts for any sensor group 34 where those conditions are predicted to be met. For example, if the weather interface 152 determines that it takes an average of 5 inches/hr of rain to cause "Roof Drain A" to trigger a low alert—the portal 22 will inform the user (e.g., via an alert or other notification) that Roof Drain A is at risk of a low alert every time 5 or more inches/hr of rain are forecast at that particular location. In some embodiments, such alerts may include a "confidency" rating based on the likelihood such weather conditions are expected to occur (e.g., "80% Chance of Alert conditions for Roof Drain A on [Date]").

The invention claimed is:

1. A connected roof drain assembly comprising:
a roof drain;
a sensor group in operable communication with the roof drain and configured to output signals representative of the fluid flow through the roof drain; and
a communication assembly configured to receive the signals output by the sensor group and wirelessly transmit data to a user portal based at least in part on the signals output by the sensor group,
wherein the roof drain includes a Primary outlet and an overflow outlet, and wherein the sensor group is in fluid communication with the overflow outlet.

2. The connected roof drain assembly of claim 1, wherein the communication assembly is configured to transmit a low alert, when the fluid flow level within the roof drain exceeds a first threshold, and wherein the communication assembly is a high alert when the fluid flow level within the roof drain exceeds a second threshold greater than the first threshold.

3. The connected roof drain assembly of claim 1, wherein the communication assembly is configured to receive the signals output by the sensor group and maintain a sensor status state for each sensor to produce a sensor status matrix.

4. The connected roof drain assembly of claim 3, wherein the communications assembly is configured to transmit the sensor status matrix to the user portal at predetermined time intervals, independent of any changes to the sensor status matrix.

5. The connected roof drain assembly of claim 4, wherein the communications assembly is configured to transmit the sensor status matrix to the user portal in response to a change in the sensor status matrix.

6. The connected roof drain assembly of claim 3, wherein the communications assembly is configured to transmit the entire sensor status matrix to the user profile in response to a change in the sensor status matrix.

7. The connected roof drain assembly of claim 4, wherein the communications assembly is configured to update the entire sensor status matrix before each transmission.

8. The connected roof drain assembly of claim 1, wherein the user portal includes a current status interface including a plurality of entries, each identifying a drain entity and listing the current status of the corresponding drain entity.

9. The connected roof drain assembly of claim 8, wherein the drain entity includes a specific sensor group or roof drain.

10. A connected roof drain assembly comprising:
a roof drain;
a sensor group in operable communication with the roof drain and configured to output signals based at least in part on the flow of fluid through the roof drain, wherein the sensor group includes one or more sensors; and
a user portal configured to receive and analyze the signals output by the sensor group, wherein the user portal is also configured to receive and analyze weather information from a weather source, and wherein the user portal is configured to produce a set of alert conditions for the at least one of the one or more sensors of the sensor group based at least in part on the signals from the sensor group and the weather information.

11. The connected roof drain assembly of claim 10, wherein the set of alert conditions may include at least one of a threshold overall volume of rainfall, or a threshold rate of rainfall.

12. The connected roof drain assembly of claim 10, wherein the user portal is in wireless communication with the sensor group via a communication assembly.

13. The connected roof drain assembly of claim 12, wherein the communication assembly is configured to interpret the signals from the sensor group as one or more alerts.

14. The connected roof drain assembly of claim 10, wherein the weather information is gathered from sensors positioned locally to the roof drain.

15. The connected roof drain assembly of claim 10, wherein the user portal is configured to receive and analyze weather forecast data, and wherein the user portal is configured to predict the time an alert may occur based at least in part on the forecast data and the alert conditions.

16. The connected roof drain assembly of claim 10, wherein the portal is configured to display the current status of one or more drain entities.

17. The connected roof drain assembly of claim 16, wherein the roof drain assembly includes one of the roof drain and the one or more sensors of the sensor group.

18. A connected roof drain assembly for use with a cloud network, the connected roof drain assembly comprising:
 a roof drain;
 a sensor group in operable communication with the roof drain and configured to output signals representative of the fluid flow therethough; and
 a communication assembly configured to receive the signals output by the sensor group and maintain a sensor status state for each sensor to produce a sensor status matrix, wherein the communication assembly is configured to wirelessly transmit the sensor status matrix to the cloud network.

19. The connected roof drain assembly of claim 18, wherein the communication assembly is configured to receive signals from the cloud network.

20. A connected roof drain assembly comprising:
 a roof drain;
 a sensor group in operable communication with the roof drain and configured to output signals representative of the fluid flow therethrough; and
 a connection interface configured to receive the signals output by the sensor group and maintain a sensor status state for each sensor to produce a sensor status matrix.

21. The connected roof drain assembly of claim 20, wherein the connection interface is configured to transmit the sensor status matrix to a user portal at predetermined time intervals independent of any changes to the sensor matrix.

22. The connected roof drain assembly of claim 20, wherein the connection interface is configured to transmit the sensor status matrix to a user portal in response to a change in the sensor status matrix.

* * * * *